United States Patent [19]

Westin

[11] Patent Number: 5,553,075
[45] Date of Patent: Sep. 3, 1996

[54] PACKET DATA PROTOCOL FOR WIRELESS COMMUNICATION

[75] Inventor: Håkan Westin, Marsta, Sweden

[73] Assignee: Ericsson GE Mobile Communications Inc., Research Triangle Park, N.C.

[21] Appl. No.: 264,056

[22] Filed: Jun. 22, 1994

[51] Int. Cl.⁶ .................................................. H04J 3/24
[52] U.S. Cl. ................. 370/94.1; 370/110.1; 395/200.1; 455/54.1
[58] Field of Search ............................. 370/94.1, 43, 99, 370/95.3, 110.1; 379/59, 60, 63, 200, 275, 325; 360/825.44, 825.47, 825.52; 375/222, 377, 219, 220; 455/54.1

[56] References Cited

U.S. PATENT DOCUMENTS

| | | | |
|---|---|---|---|
| 4,665,519 | 5/1987 | Kirchner et al. | 370/94.1 |
| 4,697,281 | 9/1987 | O'Sullivan | 379/59 |
| 4,845,667 | 7/1989 | Höptner et al. | 364/900 |
| 5,056,088 | 10/1991 | Price et al. | 370/94.1 |
| 5,107,489 | 4/1992 | Brown et al. | 370/58.2 |
| 5,128,945 | 7/1992 | Enns et al. | 371/37.1 |
| 5,163,045 | 11/1992 | Caram et al. | 370/60.1 |
| 5,163,049 | 11/1992 | Smith et al. | 370/94.1 |
| 5,184,348 | 2/1993 | Abdelmouttalib et al. | 370/95.1 |
| 5,208,810 | 5/1993 | Park | 370/94.1 |
| 5,229,994 | 7/1993 | Balzano et al. | 370/85.13 |
| 5,241,542 | 8/1993 | Natarajan et al. | 370/95.3 |
| 5,245,616 | 9/1993 | Olson | 371/32 |
| 5,247,380 | 9/1993 | Lee et al. | 359/118 |
| 5,260,933 | 11/1993 | Rouse | 370/14 |
| 5,267,244 | 11/1993 | Messerschmitt et al. | 370/95.3 |
| 5,276,680 | 1/1994 | Messenger | 370/85.1 |
| 5,283,781 | 2/1994 | Buda et al. | 370/13.1 |
| 5,297,144 | 3/1994 | Gilbert et al. | 370/94.1 |
| 5,303,344 | 4/1994 | Yokoyama et al. | 395/200 |
| 5,305,308 | 4/1994 | English et al. | 370/32.1 |
| 5,400,335 | 3/1995 | Yamada | 370/110.1 |

FOREIGN PATENT DOCUMENTS

| | | |
|---|---|---|
| 578041 | 1/1994 | European Pat. Off. . |
| 587980 | 3/1994 | European Pat. Off. . |
| 590464 | 4/1994 | European Pat. Off. . |
| WO95/13577 | 5/1995 | WIPO . |

OTHER PUBLICATIONS

"A Hybrid Medium Access Control Protocol for Wireless LANs", K. S. Natarajan, IEEE, pp. 134–137 (1992).

"A New Radio Access Protocol and Network Architecture for Mobile Packet Data", Dr. John L. Hine, IEEE, pp. 399–407 (1991).

"Performance Analysis and Design Guidelines of a Mobitex Modem at 8 kb/s", Mohammed El-Tanany, Prof. et al., IEEE, pp. 110–113 (1992).

"Cordless Computing—Systems and User Experience", Colloquium organized by Professional Groups C14 and C3, Tuesday, Jan. 12, 1993 (various articles of the day's program attached thereto).

Primary Examiner—Alpus H. Hsu
Assistant Examiner—Ricky Q. Ngo
Attorney, Agent, or Firm—Burns, Doane, Swecker & Mathis, L.L.P.

[57] ABSTRACT

A protocol for communicating over a network, for example a wireless network, is disclosed. Protocol data units for establishing and destroying a connection, data transmission and reception control, status and error are provided.

11 Claims, 3 Drawing Sheets

PACKET DATA PROTOCOL FOR WIRELESS COMMUNICATION

BACKGROUND

The present invention relates generally to methods and systems for wireless communications and, more particularly, to protocols used in wireless communications to send and receive packet data.

Packet switched communication networks evolved from the need to conserve data communication resources. Since data is sent in discrete packets, rather than as a continuous transmission, gaps in communication on one connection can be efficiently utilized by providing packets from other connections to fill those gaps. Since there is no direct connection between terminals in a packet switching environment, the link is called a virtual connection. Rather than being readily identified by its association with a direct, physical channel, a connection on a packet switched network using a virtual channel is instead determined by a plurality of identifiers. These identifiers, and other information needed to provide smoothly flowing communications in packet switched networks, are provided by protocols which define the rules of communicating on a packet switched network. These rules are also needed so that system programmers and developers have a common baseline from which to design compatible systems.

There are many different protocols for communicating over networks in general. Some protocols, such as the AT protocol commonly used in computer modems, were initially designed for wire-bound networks and later expanded for use in wireless networks. Wire-bound networks, however, are relatively high speed systems as compared with wireless networks since it takes much longer to propagate a packet in a wireless environment. Thus, wire-bound protocols are not designed to effectively handle the idiosyncracies of wireless systems, e.g., propagation delays, transmission disturbances, etc.

Other protocols are provided in communication network adaptor cards which allow computers to communicate over, for example, wide area or local area networks. Examples of this type of protocol include Ethernet, TCP/IP, NetWare, etc. Much like the AT protocol, however, these protocols were designed with high speeds, e.g., 10 Mbits/s, in mind.

Asynchronous transfer mode (ATM) is a more recent development in the communication protocol arena which can be used to transfer data with different requirements on a broadband ISDN network. Like the other protocols, however, ATM is defined only for high speed connections.

A network known as the Mobitex network has its own protocol, the Mobitex Asynchronous Communication (MASC), which is defined for a serial interface between a computer and a modem. This protocol, however, is complex and difficult to use. Moreover, MASC was developed a number of years ago without considering the possibility of wireless communication and has several limitations in this regard. For example, an eight bit data byte is coded as two data bytes according to MASC so that each byte can be sent as seven data bits with one bit parity.

Over the years, MASC has evolved and new commands have been added. Unfortunately, these additions to MASC have not always been consistent and, thus, there is no one algorithm or set of commands which is generic. Instead, each command is unique which creates many problems for those using the Mobitex system. Delimiters exemplify the inconsistencies of the MASC protocol. MASC uses both "," and "/" symbols as delimiters. Even the usage is inconsistent, as MASC sometimes uses delimiters even when the parameters being communicated have fixed lengths.

SUMMARY

These and other drawbacks and deficiencies of conventional communication protocols are overcome according to the present invention which provides a novel protocol that can be, for example, integrated into existing systems. Protocols according to the present invention are specifically designed to accommodate, among other concerns, the unique characteristics of wireless communication. These protocols are independent of any particular medium and can be used with interfaces such as PCMCIA, serial or IR.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In order to fully appreciate protocols, systems using such protocols and methods of communicating according to the present invention, a brief description of exemplary protocols according to the conventional MASC system will first be provided.

The INIT frame is used to set communication parameters for the MASC protocol between the PC host and the radio modem. An exemplary structure of the frame INIT according to the MASC protocol is as follows.

| ^ | 0 | length | B | SP | len | , | int | : | check | CR |
|---|---|--------|---|----|----|---|-----|---|-------|----|
| 1 | 0 | 3 | 1 | 1 | 3 | 1 | 1-4 | 1 | 2 | 1 |

The text field is divided into five distinct sections. The B field is simply the letter B in hexadecimal notation, i.e., 42. This is followed by a space character, hexadecimal 20. Next, the LEN field is a three-digit ASCII coded hexadecimal number which sets the maximum length of an information frame. This field is typically set to a maximum possible frame size, e.g., hexadecimal 47E. The fourth field is a comma sign which separates the LEN field from the INT field. The INT field specifies the shortest time between two subsequent frames. This value can, for example, be given in 10 ms increments with a default value of 0.

The default communication parameters are used until an INIT frame has been received. An INIT frame should be the first frame sent after startup and, after an INIT frame is received, the protocol should notify the application that connection with the radio modem has been established and that a start sequence can follow.

For sending and receiving data via the radio modem according to the MASC system, the M-frame protocol is used. A radio modem that receives an M-frame from the PC sends a data packet (MPAK) via the radio path to the network. If the M-frame contains a sequence number, then an indicator is sent to the PC along with the sequence number. Data packets received via the radio path are sent over the MASC interface to the PC using the M-frame protocol. These data packets which come from the PC are required to have valid information in the header, e.g., sender, traffic state, class, packet type, size, etc., and accurate length. The structure of the M-frame is as shown below.

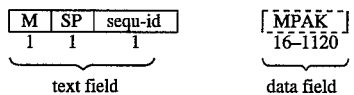

Figure 1:
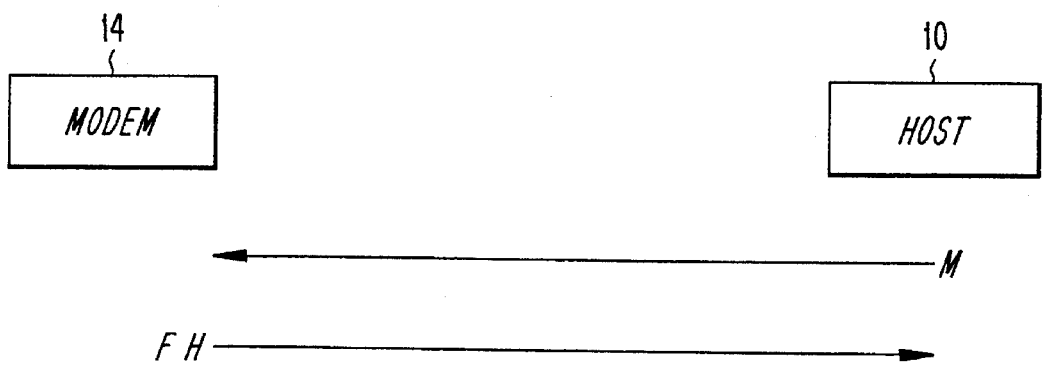
FIG. 1 illustrates a conventional M-frame connection protocol according to the MASC between a host and a radio modem.

An exemplary sequence of transmissions between the host and the radio modem for the M-frame protocol is illustrated in FIG. 1. Therein, the host 10 transmits an MPAK, denoted 'M', to modem 14. After sending the MPAK on to the network, the modem 14 returns an F H signal to the host 10.

In addition to data transmission and reception commands, the MASC protocols also provide for various control commands including the following:

ACK—acknowledgement of inaccurately received information frame.

NACK—negative acknowledgement, an inaccurately received information frame.

RACK—request for retransmission of the previous ACK.

SENS—link layer control.

SACK—SENS acknowledgement.

The structure of these control commands is illustrated below.

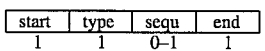

To turn off the radio modem, the FO-frame is used. When received, the radio modem starts to clear the buffers of stored data packets and tries to send the Q data packets to the network. The radio modem then sends an inactive packet to the network and confirms that the buffer is empty by sending an FO-frame back to the PC. The structure of the text field in the FO-frame is as follows.

Figure 2:
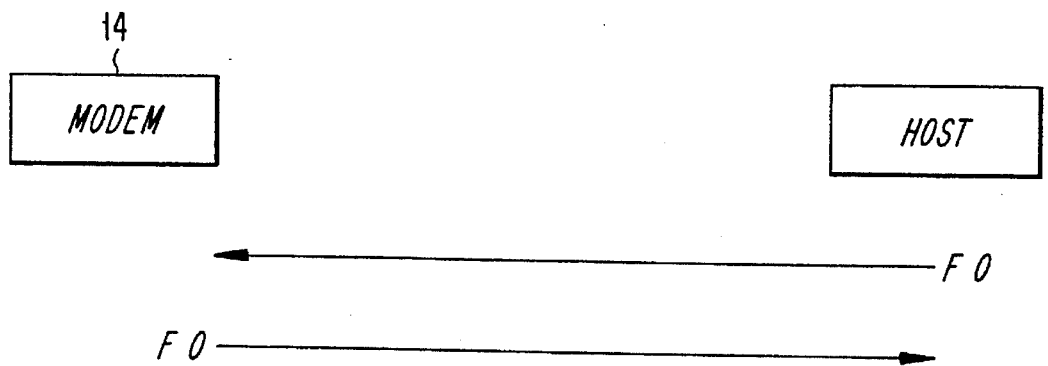
FIG. 2 illustrates a conventional FO-frame protocol according to the MASC between a host and a radio modem.

An exemplary order of signal transmissions is shown in FIG. 2 for the MASC FO-frame protocol.

Having described a conventional protocol for communicating in packet switched networks, protocols according to the present invention will now be described. The basic protocol data units (PDUs) and their parameters are:

| Host to Radio modem | Function |
| --- | --- |
| (1) Open | Establish a connection to the radio modem. |
| (2) Data | Sends a data packet. |
| (3) Control | Control commands to the radio modem. |
| (4) Close | Disconnect from the radio modem. |

| Radio modem to Host | Function |
| --- | --- |
| (1) Opened | The radio modem confirms the connection. |
| (2) DataReport | Report of the request to send data. |
| (3) Control Report | Report of the request to perform a control command. |
| (4) Closed | The radio modem confirms the disconnection. |
| (5) Status | Status information from the radio modem. |
| (6) Error | The radio modem has received an erroneous command. |

The structure of the above-described PDUs generally looks like:

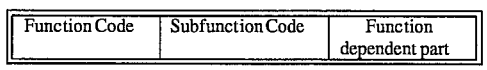

Function Codes group the various messages into different categories, while the Subfunction Codes provide more specific information about each Function Code. For example, the Function Code for "status" merely indicates that a status change has occurred, while the appended Subfunction Code provides information indicating what type of status change occurred, e.g., loss of contact with the network. The PDU structure for Report PDUs, i.e., DataReport and ControlReport, looks like:

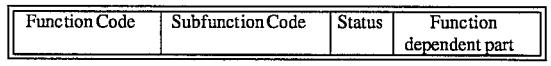

The function code and subfunction code shown can be related for a request and a report. Thus, the function code and the subfunction code used for the PDU Data can also be used in the PDU DataReport and the same is true for PDU Control and PDU ControlReport.

In the report PDUs, a status field is added. The status field has some common status codes that are defined for all report PDUs. They are:

| Ok | Requested function completed with no errors |
| --- | --- |
| Fail | Fail to do requested function |
| Aborted | Requested function aborted |
| Busy | Requested function already active |

The different report PDUs also have type specific status codes. For example, the DataReport PDU can have a type-specific status codes entitled "Illegal Addressee." These status codes, of course, are exemplary in nature and may be network dependent.

Figure 3:
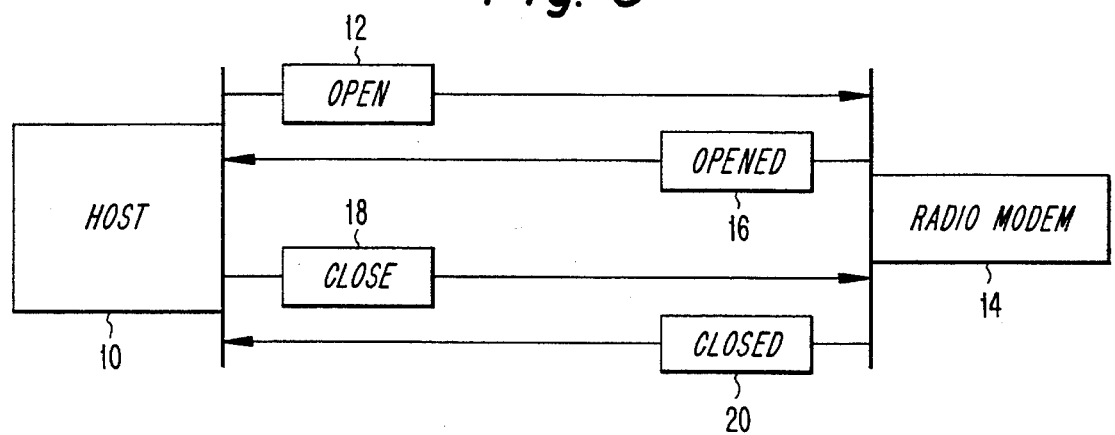
FIG. 3 illustrates a connection protocol sequence between a host and a radio modem according to an exemplary embodiment of the present invention.

The above-defined PDUs are now described as they can be used in exemplary systems and methods according to the present invention. FIG. 3 illustrates in block fashion the PDUs used for establishing and ending a connection between host unit 10 and radio modem 14.

To establish a connection, the host 10 sends a PDU Open 12 to the radio modem 14. The radio modem 14 replies with PDU Opened 16, including radio modem parameters such as, for example, a subscriber number. By this exchange of PDU's, the connection is established and the radio modem 14 activates the radio function.

When the connection is to be terminated, the host 10 initiates a disconnection with the PDU Close 18. The radio modem 14 answers with PDU Closed 20 to confirm the disconnection. The radio modem 14 then deactivates the radio function.

Figure 4:
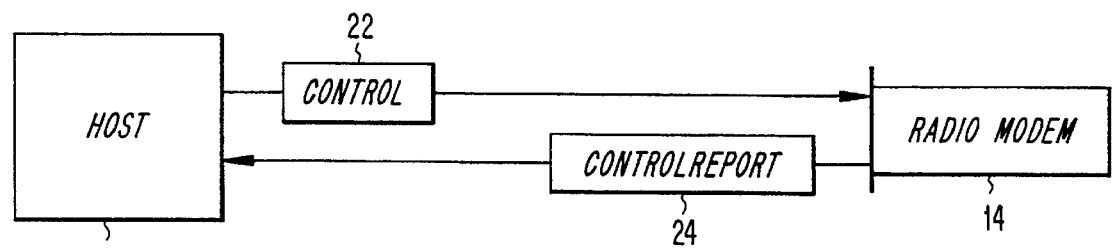
FIG. 4 illustrates a control protocol sequence between a host and a radio modem according to an exemplary embodiment of the present invention.

The host 10 can also control the radio modem 14. For example, the host can block operation of the transmitter. The host uses the PDU Control 22 for that purpose as shown in FIG. 4. The radio modem 14 indicates the result with PDU ControlReport 24.

Figure 5:
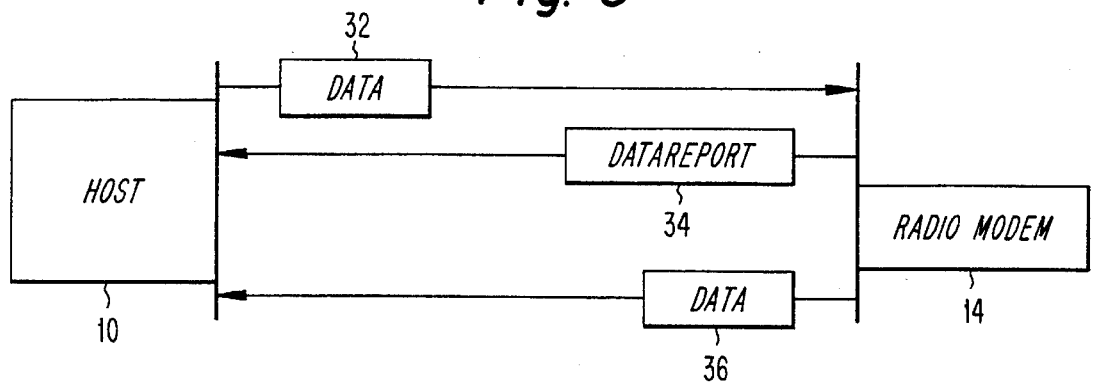
FIG. 5 illustrates a protocol for data units transmitted between a host and a radio modem according to an exemplary embodiment of the present invention.

In FIG. 5, the host 10 sends data with the PDU Data 32. The radio modem 14 answers with PDU DataReport 34 to indicate if the request was successful or not. Incoming data from the radio modem 14 comes in the PDU Data 36. No reply is returned from the host 10 for incoming data.

Figure 6:
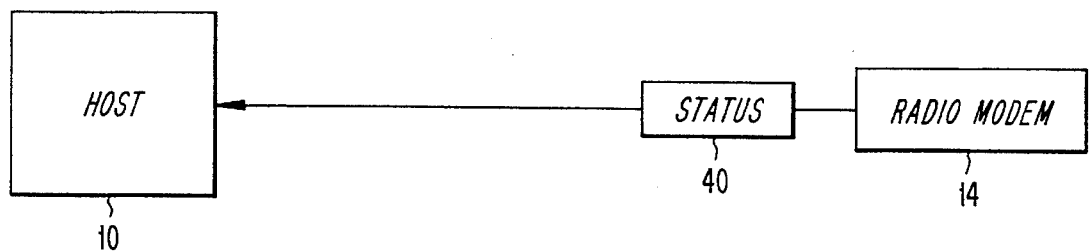
FIG. 6 illustrates a status protocol according to exemplary embodiments of the present invention.
Figure 7:
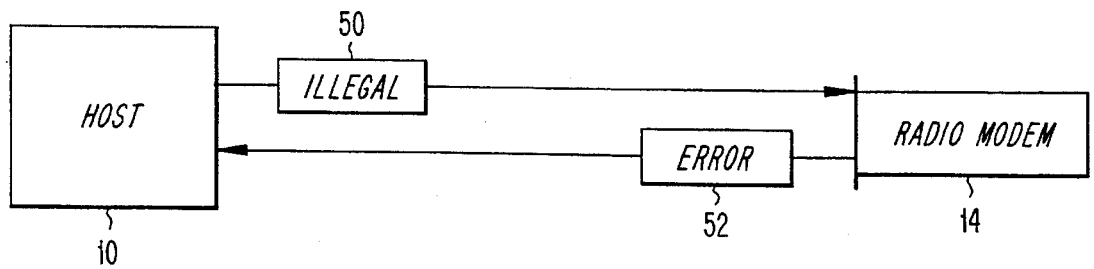
FIG. 7 illustrates an error protocol according to exemplary embodiments of the present invention.

In FIG. 6, the radio modem 14 indicates status changes with the PDU Status 40. Exemplary status changes include loss of network contact or establishment or network contact. If the host 10 sends an unknown or illegal PDU 50, the radio modem 14 replies with the PDU Error 52 as seen in FIG. 7.

By using protocols according to the present invention, many advantages over conventional systems are realized, particularly in wireless environments. As compared, for example, with the conventional MASC system, protocols according to the present invention have minimal protocol overhead which is correspondingly more important in environments (e.g., wireless) where data throughput is relatively low. Moreover, having been designed as a whole, rather than piecemeal, the PDP protocol provides an approach that is consistent, as well as easy to implement and extend.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for communicating over a network between a host and a remote unit comprising the steps of:

transmitting one of a first group of network protocol data units for communicating in a host-to-remote unit direction, said first group including an open protocol data unit for establishing a connection with said remote unit, a data protocol data unit including data for receipt by said remote unit, a control protocol data unit for sending control commands to said remote unit and a close protocol data unit for closing said connection with said remote unit; and providing a second group of network protocol data units for communicating in a remote unit-to-host direction, said second group including an opened protocol data unit for confirming a connection established by said open protocol data unit, a data report protocol data unit for indicating if forwarding of said data by said data protocol data unit was successful, a control report protocol data unit for indicating a result associated with said control protocol data unit, a status protocol data unit for indicating changes in status of said remote unit, and a closed protocol data unit responsive to said close protocol unit, each of said second group of network protocol data units corresponding to one of the network protocol data units in said first group, respectively; and transmitting a corresponding one of said network protocol data units in said second group to said host in response to said one of said first group of network protocol data units received by said remote unit.

2. The method of claim 1 wherein at least one of said protocol data units includes a function code field, a subfunction code field which provides additional information associated with said function code field, and a function dependent part.

3. The method of claim 2, wherein said data report protocol unit and said control report protocol unit also include a status field.

4. The method of claim 1, wherein said remote unit is a radio modem.

5. A method for communicating in a network between a host and a remote unit, said remote unit for transmitting data over an interface comprising the steps of:

sending an open protocol data unit from said host to said remote unit to establish a connection therebetween;

issuing an opened protocol unit responsive to the open protocol data unit to the host from the remote unit confirming a connection therebetween;

sending a data protocol data unit from the host to the remote unit;

transmitting data contained in said data protocol data unit from said remote unit over said interface:

issuing a data report protocol data unit to the host from the remote unit reporting an outcome of the request to send data;

transmitting a closed protocol data unit from the host unit to the remote unit; and returning a closed protocol data unit to the host unit from the remote unit indicating that the remote unit has disconnected the link.

6. The method of claim 5 further comprising the steps of:

sending a control protocol data unit to the remote unit from the host; and returning a control report protocol data unit to the host from the remote unit which reports an outcome of the request to perform a control command associated with the control protocol data unit.

7. The method of claim 6 further comprising the step of providing, as said control report protocol data unit, a function code field, a subfunction code field, a status field, and a function dependent part field, wherein said status field includes information which indicates said outcome of the request to perform the control command.

8. The method of claim 5 further comprising the step of issuing a status protocol data unit to the host from the remote unit which reports status information relating to the remote unit.

9. The method of claim 5 further comprising the step of:

generating an error protocol data unit which indicates that the remote unit has received an erroneous command from the host.

10. The method of claim 5, wherein said remote unit is a radio modem and said interface is an interface.

11. A method for communicating over a network between a host and a remote unit comprising the steps of:

transmitting one of a first group of network protocol data units for communicating in a host-to-remote unit direction, said first group including an open protocol data unit, a data protocol data unit, a control protocol data unit and a close protocol data unit;

providing a second group of network protocol data units for communicating in a remote unit-to-host direction, said second group including an opened protocol data unit, a data report protocol data unit, a control report protocol data unit, a status protocol data unit, and a closed protocol data unit corresponding to the network protocol data units in said first group, respectively;

transmitting a corresponding one of said network protocol data units in said second group to said host in response to said one of said first group of network protocol data units received by said remote unit;

transmitting as said one of said protocol data units from said first group a data protocol data unit; and transmitting as said one of said protocol data units from said second group a data report protocol data unit having a function code field and a subfunction code field with values that are the same as those found in the corresponding fields of said data protocol data unit.

* * * * *